(12) United States Patent
Potts et al.

(10) Patent No.: US 6,941,979 B1
(45) Date of Patent: Sep. 13, 2005

(54) CONTAINER DRILLING APPARATUS FOR NON-INTRUSIVE PERFORATION OF PRESSURIZED CONTAINERS

(76) Inventors: Larry Ray Potts, 4742 N. Oberlin St., Portland, OR (US) 97203; Richard Allen Potts, 11405 26th Ave. SW., Seattle, WA (US) 98146-3406

( * ) Notice: Subject to any disclaimer, the term of this patent is extended or adjusted under 35 U.S.C. 154(b) by 0 days.

(21) Appl. No.: 10/462,255

(22) Filed: Jun. 16, 2003

(51) Int. Cl.⁷ .............................................. B65B 31/04
(52) U.S. Cl. ...................................... 141/65; 141/329
(58) Field of Search .............................. 141/51, 65, 97, 141/231, 329, 330; 222/80–83.5, 87, 88

(56) References Cited

U.S. PATENT DOCUMENTS

| | | | |
|---|---|---|---|
| 5,301,594 A | * | 4/1994 | Argazzi et al. ................. 86/50 |
| 5,349,755 A | | 9/1994 | Haywood |
| 5,370,268 A | | 12/1994 | Adams |
| 5,499,665 A | | 3/1996 | Gold et al. |
| 5,957,168 A | | 9/1999 | Nickens et al. |
| 6,240,981 B1 | | 6/2001 | Nickens et al. |

* cited by examiner

*Primary Examiner*—Justine R. Yu
*Assistant Examiner*—Peter deVore
(74) *Attorney, Agent, or Firm*—Mark S Hubert

(57) ABSTRACT

A drum drilling apparatus that is capable of powered operation with standard issue emergency crew SCBA equipment. The drum drill resides moveably on a platform that is adaptable to be positioned about any sized container regardless of any irregularities in the ground surface. It provides several safety related features such as the capability for remote operation, static electric grounding, and explosion shielding. It has sampling/purge capabilities and adapts for use with LPG cylinders. It is lightweight and capable of operation by one person. It provides the least intrusive method of drum depressurizing.

17 Claims, 17 Drawing Sheets

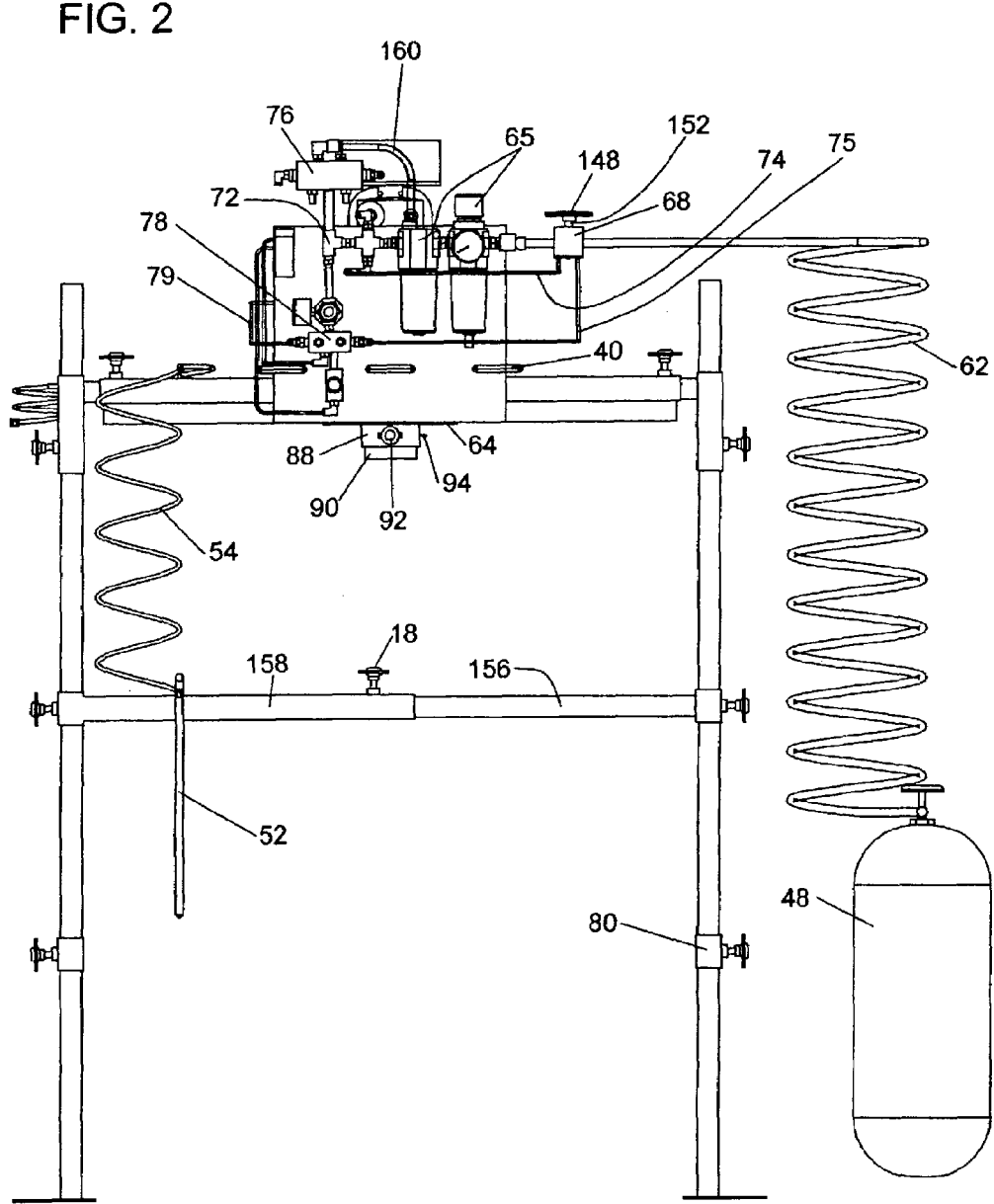

CONTAINER DRILLING APPARATUS FOR NON-INTRUSIVE PERFORATION OF PRESSURIZED CONTAINERS

BACKGROUND OF THE INVENTION

The present invention relates to a portable apparatus for safely drilling holes in any drum, cylinder or similar sealable container, and more particularly, through remote operation and without moving the drum. Further, this invention may be quickly set up and operated by a single person in remote field locations and powered by commonly used firefighter and emergency crew SCBA's. (Self Contained Breathing Apparatus) It also has the capability of being set up on uneven terrain and offers infinite positioning of the drill bit about the drum allowing for penetration through the most advantageous location.

Unlabeled, deteriorated, over pressurized drums and similar chemical containers come in a multitude of sizes and shapes, and pose a hazzard to both the environment and personnel. Often these can lead to a "boiling liquid expanding vapor explosion" (BLEVE). If handled improperly, or left to deteriorate, they can explode or rupture thereby exposing hazardous chemical contents into the environment. The safest way to handle these containers is to depressurize them in situ. Currently, this is done by shooting the container with a gun, by having someone manually attempt to open the bung or valve, or by moving the drum to another situation where an apparatus for piercing the container is located. Each of these methods increases the potential for a sudden release of the container's contents into the environment.

Besides the BLEVE'd containers, another use for this invention arises from the LPG cylinders commonly used in the manufacture of illegal drugs. Here the illegal activities are often located in congested urban areas. Handling of these hazardous containers is regulated by 29 CFR Ch. XVII 1910.120 (Hazardous Waste Operations and Emergency Response) which mandates that prior to transportation by the proper authorities, any container with visible bulging, swelling or audible sound must be depressurized. This leaves the job of depressurizing and venting these containers to the police, firefighters and emergency crew members. A safe, quick, simple and situation specific adaptable method for depressurizing these containers is needed.

Previous drum penetration devices lack the portability, pneumatic adaptability and one man operation offered by the present invention. They are thus usually fixed where there is a power supply. The prior art competitors require these dangerous drums to be moved onto a platform of the device, require the physical constraint of the drum, or clamp rigidly onto the drum. All of these actions require contact with the drum and thus actually increase the risk of explosion or content release by agitation of the drum. Simply stated, this invention provides the least intrusive method of releasing the pressure in the drum. Further, the prior art devices require their own sources of power for operation, cannot adjust to all sizes of containers, and do not have an infinitely adjustable penetration location. Although there are numerous drawbacks with the prior art inventions, the greatest problem is they cannot perform the depressurization without somehow increasing the risk of initiating a rupture or explosion. These drawbacks have prevented the widespread usage of such devices.

This new invention involves a much less invasive technique that utilizes a portable pneumatic drill with an infinitely adjustable stand that can be positioned anywhere about any BLEVE'd container regardless of where the container's location. Such flexibility of operation greatly enhances operator safety and overcomes the abovementioned drawbacks.

SUMMARY OF THE INVENTION

In accordance with the invention, an object of the present invention is to provide an improved drum drilling apparatus that can be operated by emergency crew members with minimal intrusiveness and possibility of further damage to BLEVE'ed drums.

It is another object of this invention to provide an improved drum drill that is lightweight, quickly assembled and capable of solo setup and operation.

It is a further object of this invention to provide less intrusive method of depressurizing BLEVE'ed drums that is capable of being performed on any sized drum and in any physical location. This is accomplished using an infinitely adjustable drill positioning device.

It is still a further object of this invention to provide for drum drilling apparatus that is capable of being powered by standard issue emergency crew equipment such as SCBA.

It is yet a further object of this invention to provide for a drum drilling apparatus that has explosive shielding, electrostatic grounding, CCD wireless tv remote viewing, and remote operation capabilities to minimize the possibility for harm to emergency crew personnel.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 2 is a rear side view of the drum drill apparatus illustrating the control panel.

DETAILED DESCRIPTION

The drum drilling apparatus of the present invention, comprises a lightweight, portable frame with adjustable telescoping tubular legs supporting a platform adapted to house a pneumatic control panel and a remotely controlled pneumatic drill that has vertical travel capability. The drill is connected to the platform by a vertically angular adjustable mounting plate, such that a drill bit is capable of penetrating any container at right angles to the container's top surface or bung. With the adjustable features mentioned, this apparatus is capable of infinite adjustment about any container centered within the frame. The source of pressurized air can come from the cylinder of an emergency worker's self contained breathing apparatus (SCBA)or from a gas powered compressor. From the preferred embodiment there are additional features that may be used, as dictated by the situation. Such features are wheels and skid tubes, a suction/purge and sample adapter, and explosive protection. Alternate embodiments incorporate adapters for drilling into liquid propane gas (LPG) cylinders, and wireless remote control operation. The drill assembly and control panel are commercially available units and their specific configuration or operation is not part of the present invention.

The most practical advantage of this apparatus is that it is portable enough for one person to erect about a target container in a remote location with uneven terrain. This erection does not require the target container to physically disturbed. Once erected, this apparatus can be powered with only standard emergency crew equipment. The advantages of this invention as applied to use in perforating containers, is best illustrated.

Figure 1:
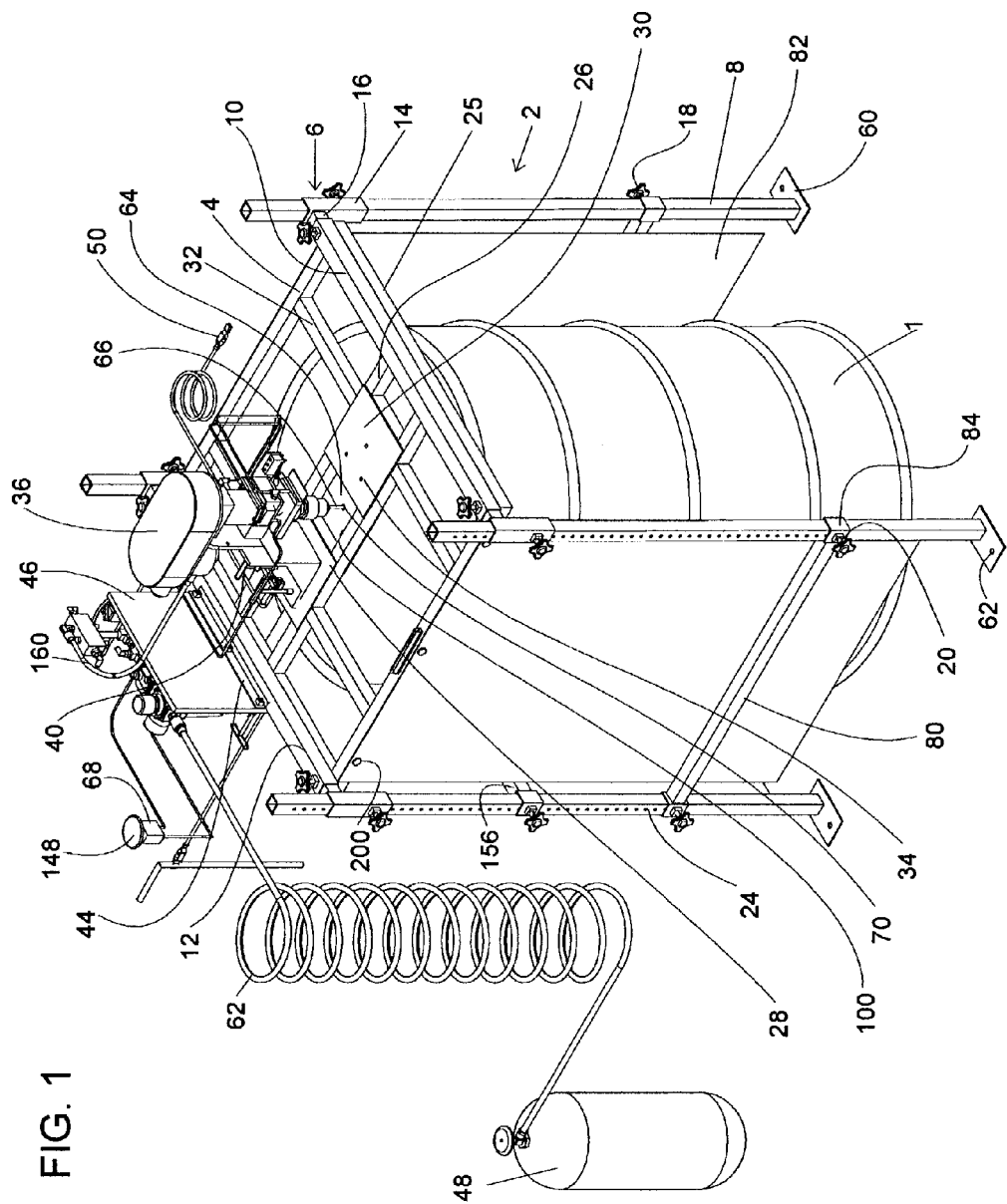
FIG. 1 is a perspective view of the preferred embodiment of the drum drill apparatus arranged about a standard 55 gallon drum and with an explosion shield installed.

Referring to FIG. 1, a perspective view of the preferred embodiment of the drum drill apparatus arranged about a standard 55 gallon drum and with an explosion shield installed, the general arrangement of the various elements of the drum drilling apparatus can be seen. Frame 2 holds platform 4 positioned above target container 1 by telescopic engagement between platform supports 6 which are slidingly engaged over leg 8 and front platform tube 10 or rear platform tube 12. Legs 8 have feet 60 for stabilization, and to serve as an anchor point for frame 2 when stakes (not illustrated) are driven into the underlying terrain, passing through feet orifices 62.

Platform support 6 is made from two pieces of square tubing. Leg tube 14 is affixed perpendicularly to platform tube 16. Leg tube 14 is sized so as to allow sliding engagement over the smaller tube of leg 8. Similarly, platform tube 16 is sized so as to allow engagement and telescopic adjustment within larger front platform tube 10 or rear platform tube 12. Bolts 20 are mechanically affixed to leg tube 14, front platform tube 10, rear platform tube 12, and adjusting tube 84.

Figure 5:
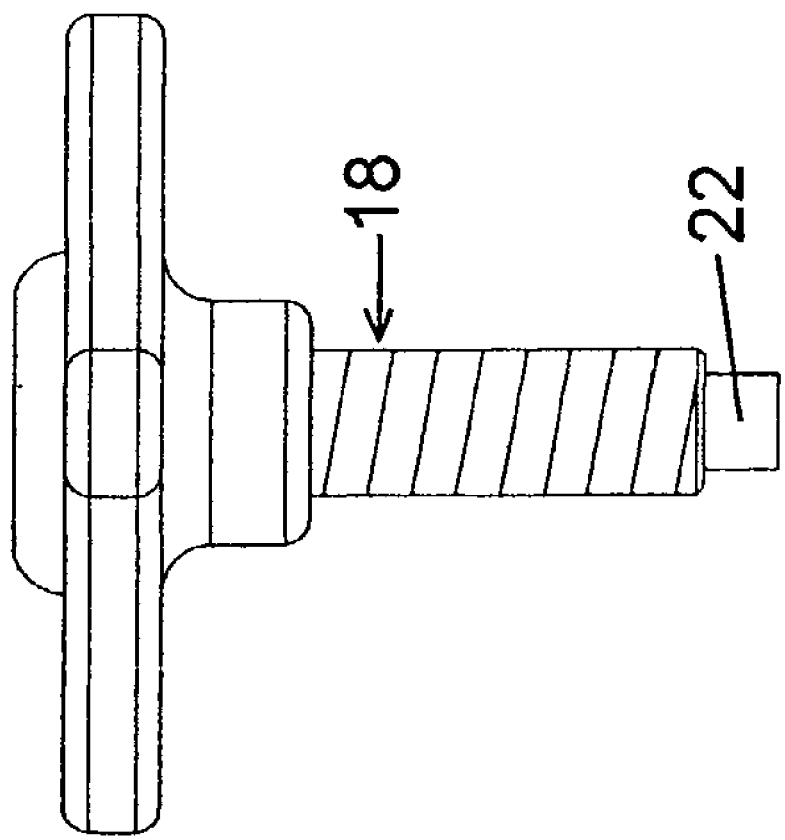
FIG. 5 is a perspective view of an adjusting knob.

Locking knobs 18 threadingly engage bolts 20 such that clockwise rotation advances pin 22 (see FIG. 5) into leg orifice 24 or substantially identical orifices on platform tube 16 (not illustrated). This engagement serves to lock platform 4 at the desired height on legs 8 and to lock legs 8 at the desired width to accommodate target container 1. Side strengthening tubes 80 span between legs 8. Adjusting tubes 84 are affixed to the distal ends of side strengthening tubes 80 and are sized so as to slidingly adjust over legs 8, locking by engagement between locking knobs 18 and structure tube holes 86. Explosion blanket 82 is mechanically attached to structure tubes 25 of platform 4 by mechanical fasteners 200.

Figure 6:
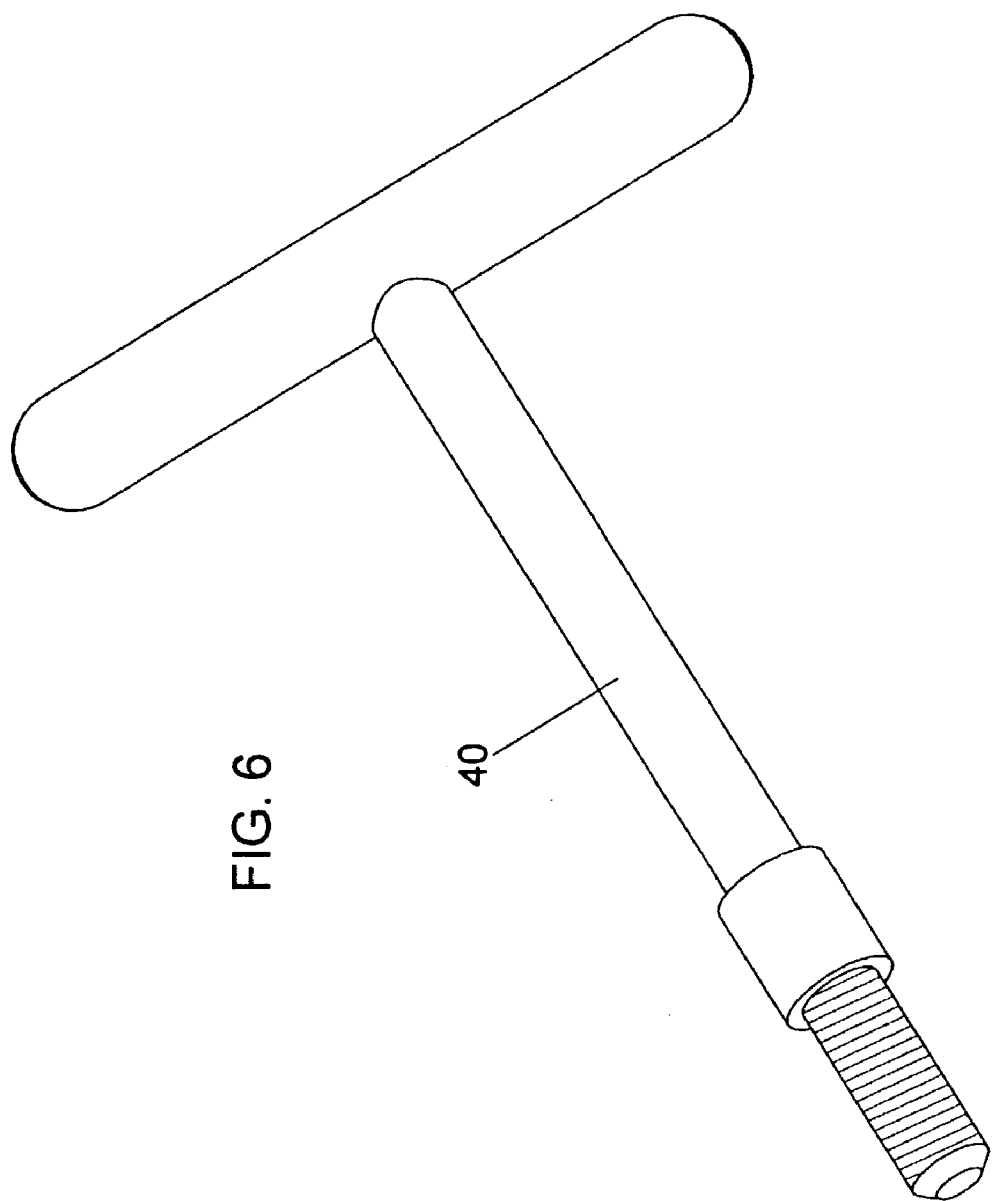
FIG. 6 is a perspective view of a T-handle bolt.
Figure 10:
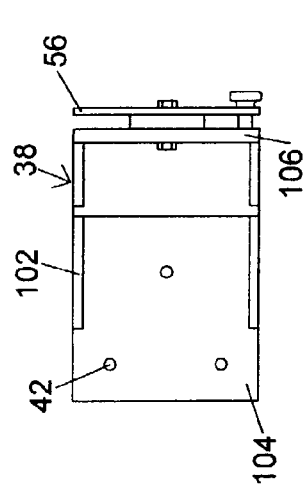
FIG. 10 is a top view of the drill mount plate.
Figure 8:
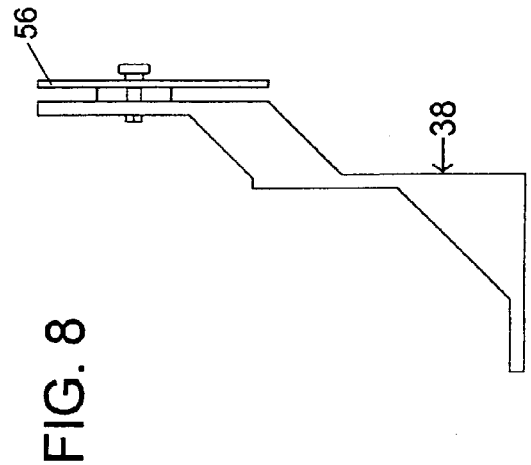
FIG. 8 is a side view of the drill mount plate.
Figure 11:
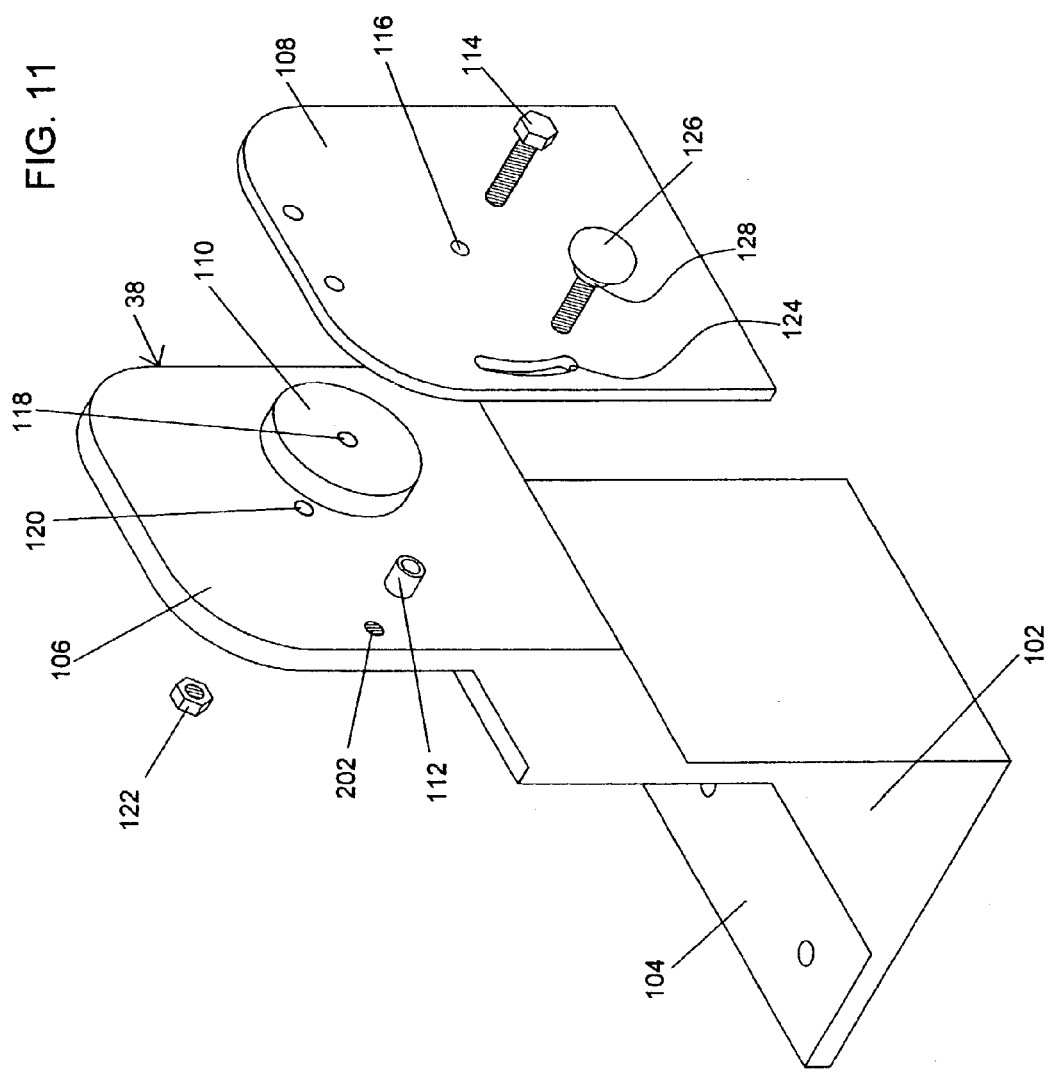
FIG. 11 is an exploded view of the drill mount plate.
Figure 12:
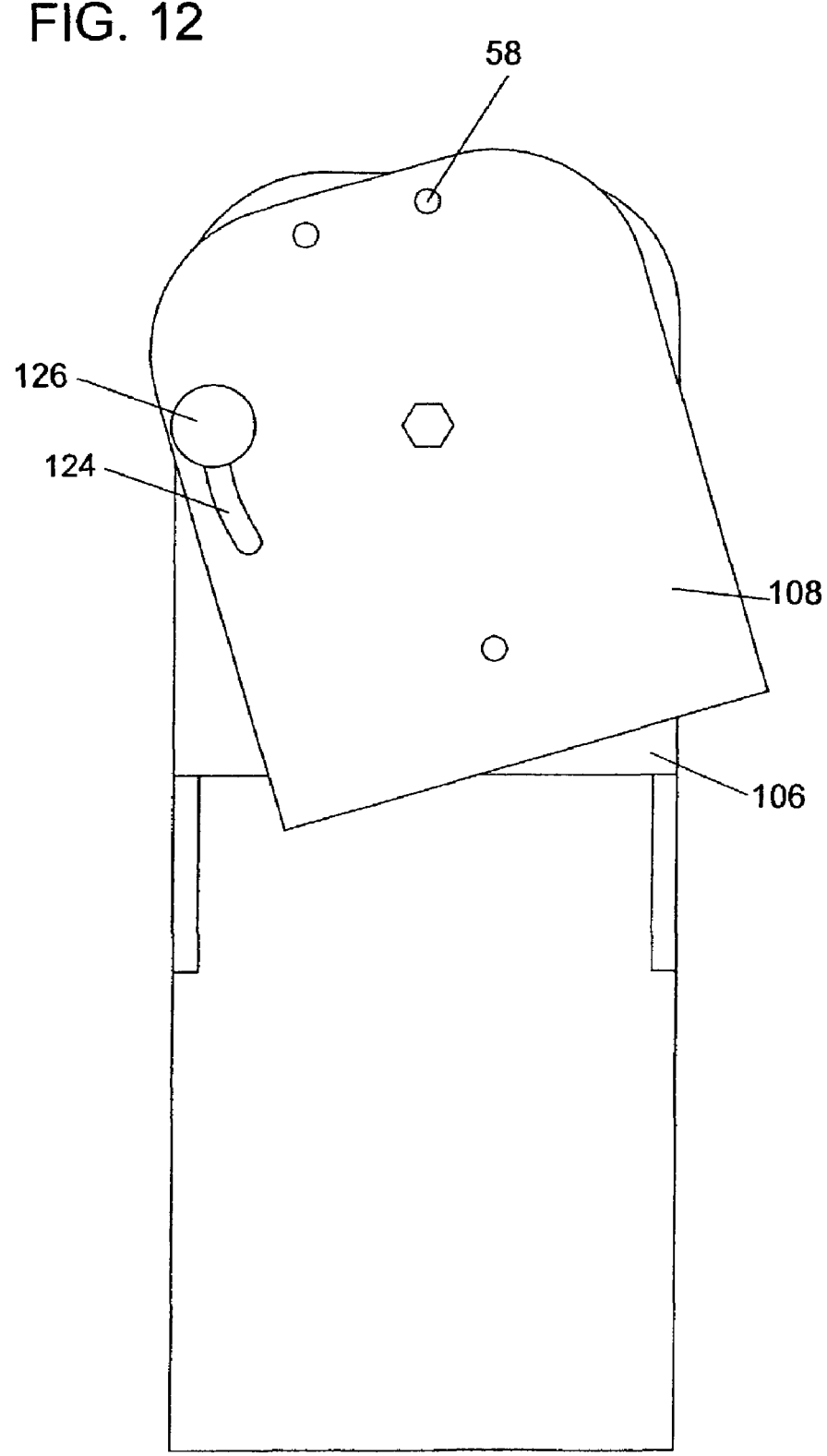
FIG. 12 is a front view of the drill mount plate showing a left tilt.

Platform 4 is of a generally planar configuration. It has four structure tubes 25 affixed in a square configuration with two parallel mounting tubes 26, attached perpendicularly between two of the parallel structure tubes 25. Upon the mounting tubes 26 are mechanically attached a first mount plate 28 and second mount plate 30. Between the mounting tubes 26 and the structure tubes 25 are structural strengthening tubes 32. These serve to add rigidity to the platform. First mount plate 28 and second mount plate 30 are substantially identical, and both define mount plate bolt holes 34. Drill assembly 36 is bolted to pivot plate 56 of drill assembly mounting bracket 38 through pivot plate bolt holes 58 (see FIGS. 8–11). Drill assembly mounting bracket 38 is then secured to first mount plate 28 by threaded engagement between T-bolts 40 (see FIG. 6) and bolt holes 34 with T-bolts 40 passing through mounting bracket holes 42 (see FIG. 10).

Drill bit 66 is chucked into drill 36 and passes through splash plate 64 via splash plate orifice 70.

Rear platform tube 12 has control panel mounting brace 44 mechanically fastened along its longitudinal axis so as to project upward and perpendicular to the plane of platform 4. Pneumatic control panel 46 is bolted to brace 44 with T-bolts 40. Pressurized air is supplied to control panel 46 from SCBA cylinder 48 through tubing 62.

Static grounding clamp 50, grounding wire 54, and grounding stake 52 (see FIG. 2) are in electrical continuity by mechanical, non-insulated connection to metal platform 4.

Looking at FIG. 2, a rear side view of the drum drill apparatus, control panel 46 can be clearly seen. SCBA cylinder 48 provides pressurized air to regulators system 64 through tubing 62 which routes the compressed air to operation switch 68. Operation switch 68 is connected to valve tee 72 by second tubing 74. Plunger 152 of operation switch 68 is attached to push disk 148. Valve tee 72 is hard piped to linear actuator air supply module 76 and drill motor air supply module 78. Suction ring 88 is attached to splash plate 64 such that the longitudinal axis of ring 88 projects normally from splash plate 64. Flexible suction ring seal 90 is attached to suction ring 88. Cam fitting 92 and inert gas/sample line 94 project from suction ring 88. Inside back strengthening tube 156 is slid into outside back strengthening tube 158 and locked into position with locking knob 18.

Figure 4:
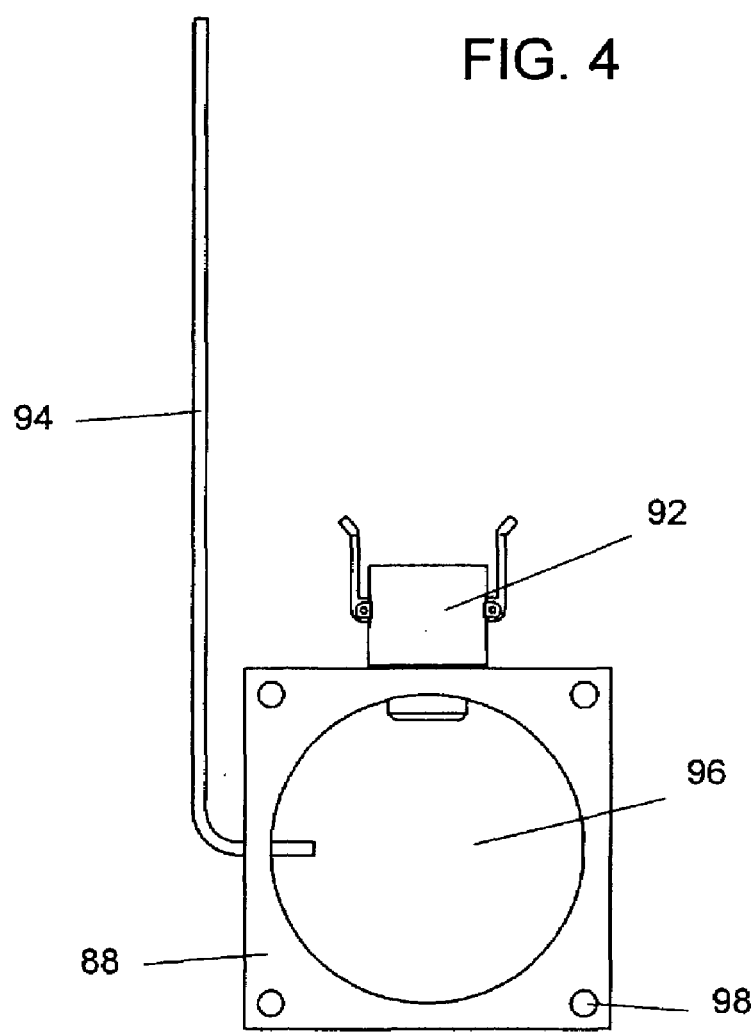
FIG. 4 is a top view of the suction ring.
Figure 3:
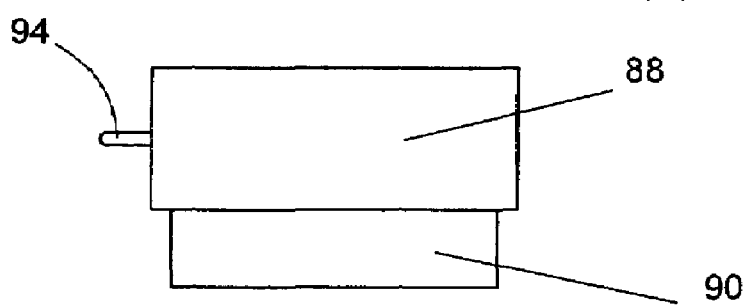
FIG. 3 is a side view of the suction ring.

Referring to FIGS. 3 and 4 together, the details of suction ring 88 can be seen. Suction ring 88 is of a block configuration that defines central passage 96 and attachment holes 98. Bolts pass through attachment holes 98 and splash plate holes 100. (FIG. 1) Suction ring seal 90 is a hollow cylindrical flexible seal mechanically attached to suction ring 88. Cam fitting 92 and inert gas/sample line 94 are friction fit into passages of suction ring 88 that have their longitudinal axis perpendicular to central passage 96.

Figure 7:
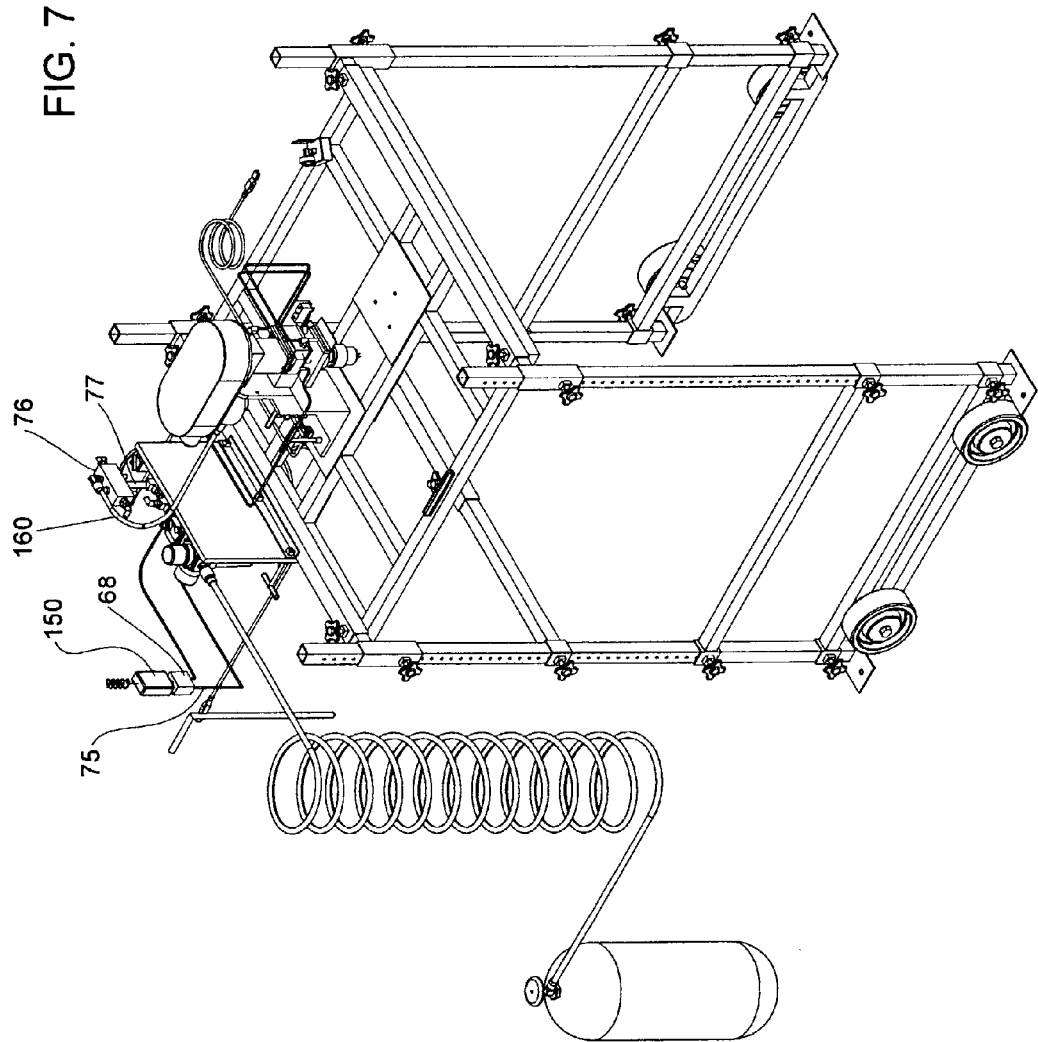
FIG. 7 is a perspective view of the drum drill apparatus with a wireless remote control start switch.
Figure 9:
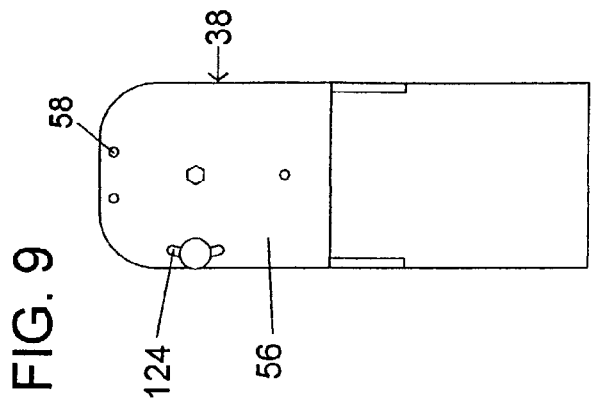
FIG. 9 is a front view of the drill mount plate.

FIG. 7 shows a perspective view of the drum drill apparatus with a wireless remote control start switch. Here, push disk 148 of operational switch 68 has been replaced by wireless actuator 150. This wireless actuator 150 is adapted to receive signals from a remote electronic transmitter (not shown) and respond by depressing plunger 152 so as to start the operation of drill assembly 36. Pressurized air is provided from regulators 65 to switch 68 through second tubing 74. (Best illustrated in FIG. 2) Note, at this time pressurized air has also been provided through valve tee 72 to air supply module 76. When plunger 152 is depressed the pressurized air is allowed to travel through switch 68 and continue through third tubing 75 to limit switch air supply module 78. Limit switch air supply module 78 in turn provides pressurized air to bottom limit switch 170 and top limit switch 174. Operation of the limit switches when conditioned appropriately provides pressurized air to air supply module 76. Air supply module 76 in turn provides pressurized air through pneumatic line 160 to spin air motor 162 and turn drill bit 66. Raising plunger 152 stops the flow of pressurized air through switch 68.

Looking at FIG. 2 and FIG. 7 together it can be seen that the pressurized air paths from SCBA cylinder 48 through tubing 62 to regulators 65 are to both linear actuator air supply module 76 thru fifth tubing 77, and drill motor air supply module 78 through valve tee 72. Drill motor air supply module 78 provides pressurized air to air motor 162 through fourth tubing 79 dependent upon the position of plunger 152 of switch 68. Linear actuator air supply module 76 provides pressurized air to linear actuator 166 via pneumatic line 160.

Figure 13:
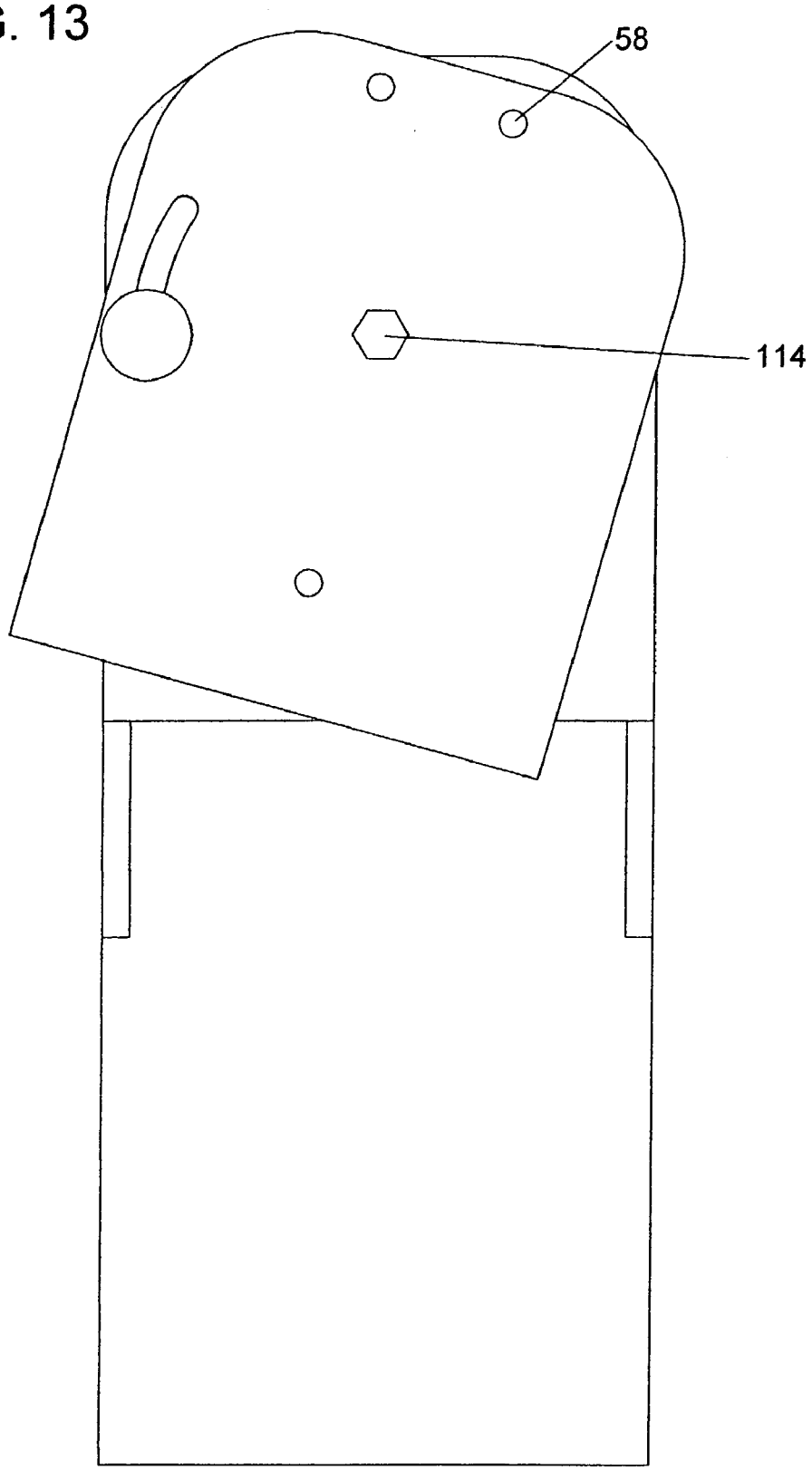
FIG. 13 is a front view of the drill mount plate showing a right tilt.

Looking at FIGS. 8–13 the drill assembly mounting bracket's 38 construction and operation can best be seen. Side plates 102 are mechanically attached to base plate 104 and front plate 106 so as to maintain all plates in an approximately perpendicular arrangement. Base plate 104 has bracket holes 42 for mounting to either first mount plate 28 or second mount plate 30. Spacer 110 and lock pin base 112 project normally from front plate 106 and are sandwiched between front plate 106 and pivot plate 108. Bolt 114 passes through first pivot hole 116, second pivot hole 118 and third pivot hole 120 and is threaded into nut 122. Arced circumferential slot 124 accommodates locking pin 126 which threadingly engages into threaded lock pin orifice 202 passing through lock pin base 112. Shoulder 128 of locking pin 126 bears against pivot plate 108 generating enough friction to lock the position of pivot plate 108 relative to front plate 106. When locking pin 126 is loosened, pivot plate 108 may tilt left (FIG. 12) or right (FIG. 13). The amount of tilt travel of pivot plate 108 is limited by the length of slot 124 which bears against locking pin 126 when engaged with pin base 112. Pivot plate bolt holes 58 allow drill assembly 36 to be bolted to pivot plate 108.

Figure 14:
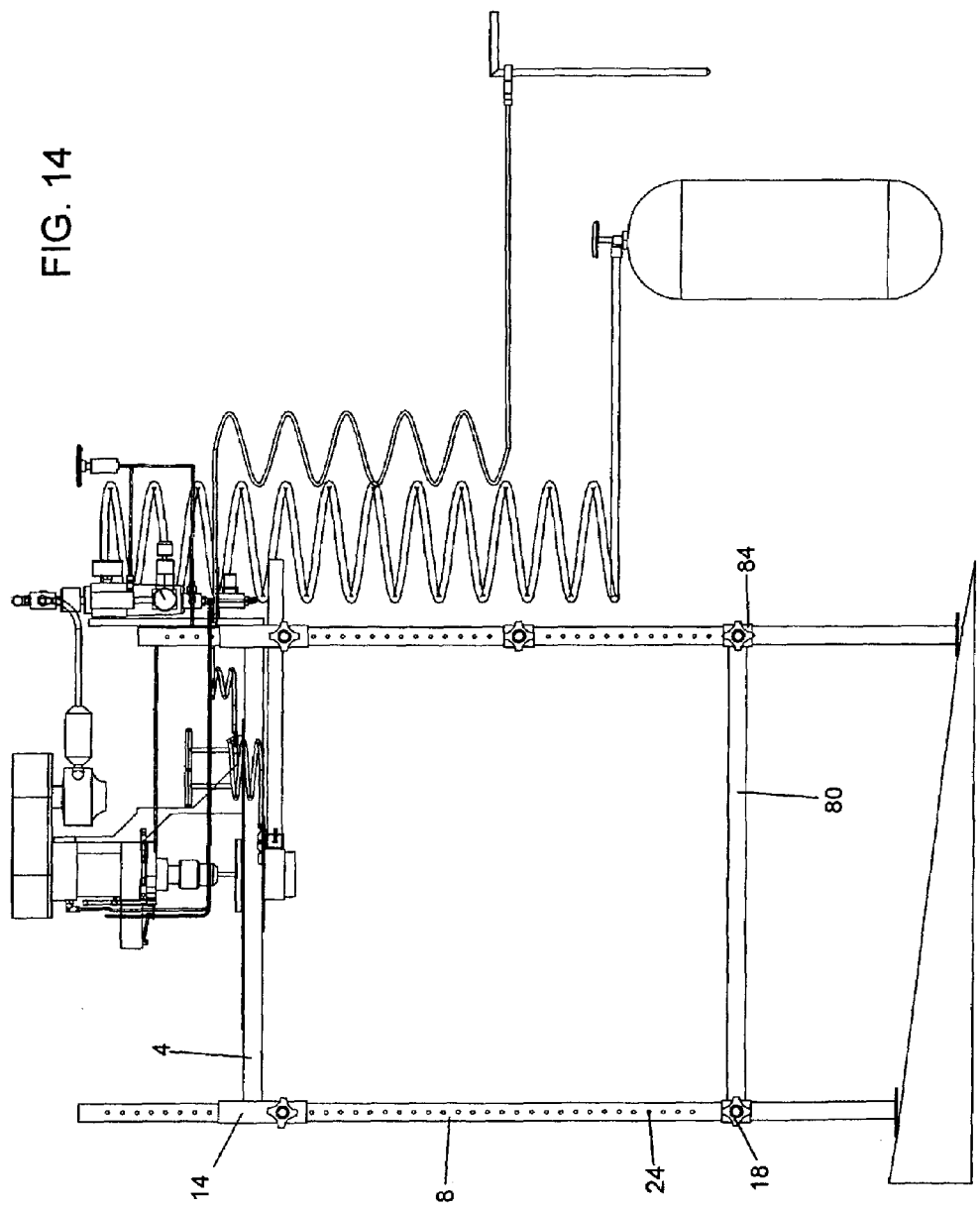
FIG. 14 is a side view of the drum drilling apparatus on uneven terrain.

FIG. 14 shows a side view of the drum drilling apparatus on uneven terrain. Legs 8 remain vertically parallel to each other and substantially perpendicular to the plane of platform 4, but the engagement of locking knobs 18 through leg tubes 14 and adjusting tubes 84 of side strengthening tube 80 are into different leg orifices 24.

Figure 15:
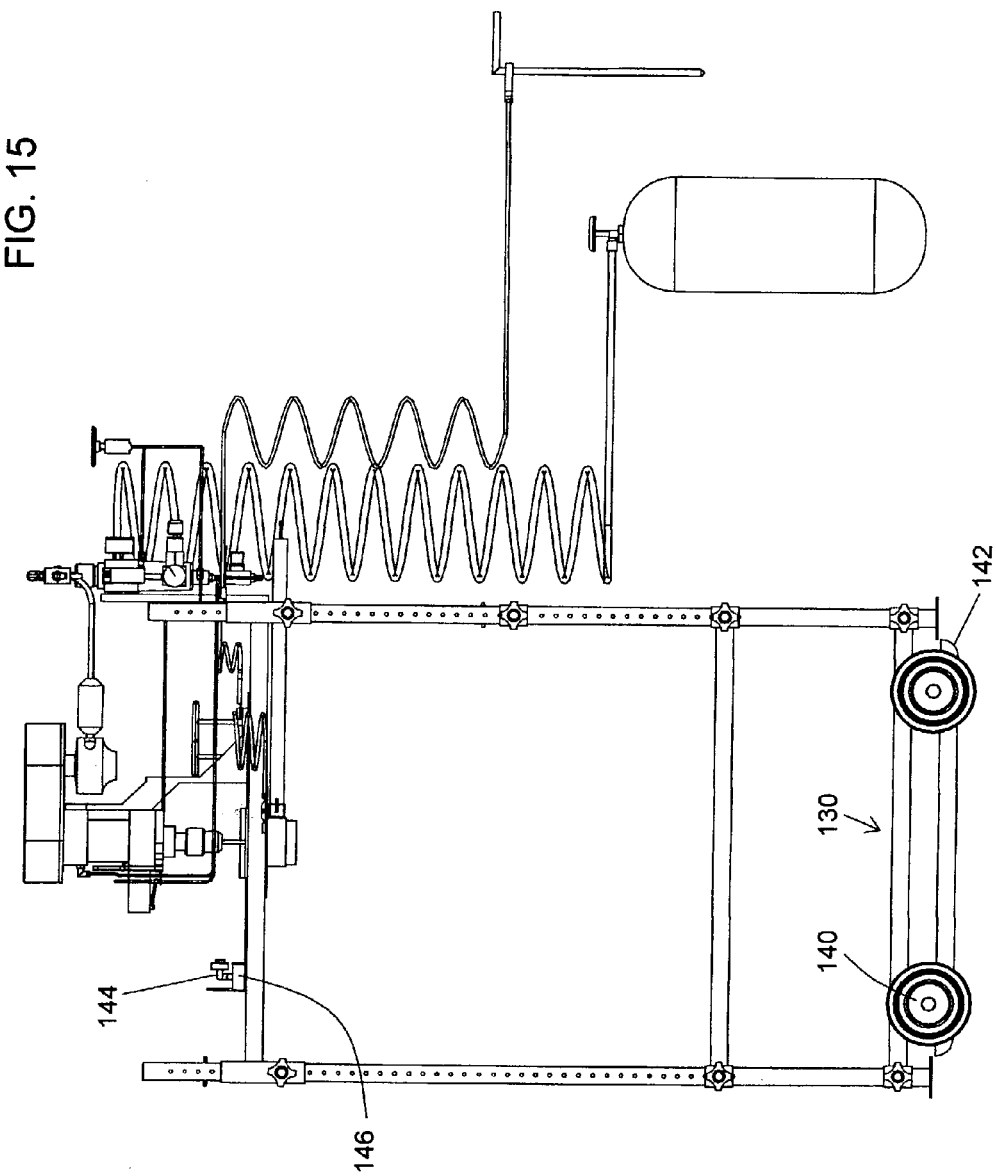
FIG. 15 is a side view of the drum drilling apparatus with the wheel and skid assembly and CCD wireless tv remote controllable camera.
Figure 16:
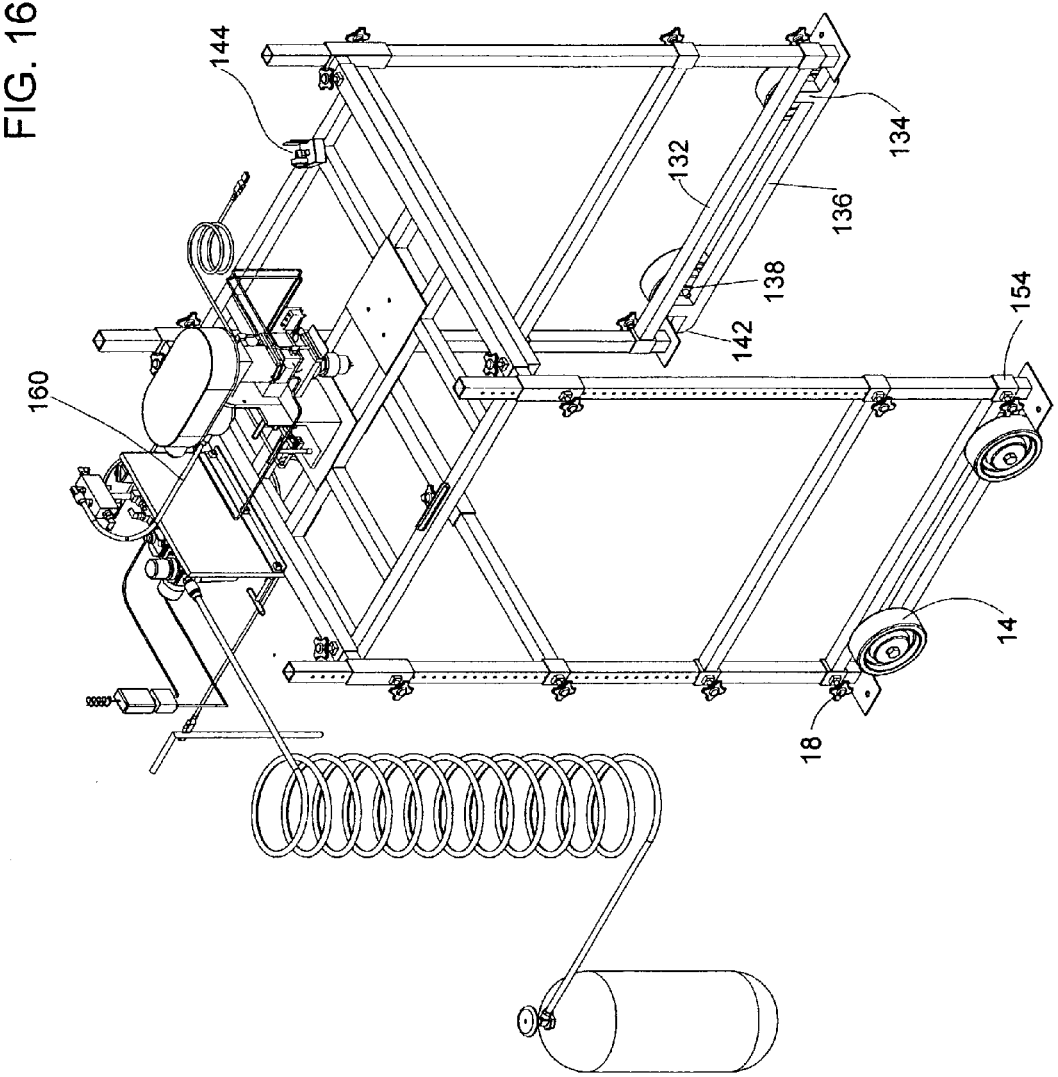
FIG. 16 is a perspective view of the drum drilling apparatus with the wheel and skid assembly and CCD wireless tv remote controllable camera.

FIGS. 15 and 16 illustrate a side view of the drum drilling apparatus with the wheel and skid tube assembly and CCD wireless TV remote controllable camera installed. Wheel and skid tube assembly 130 is made from a modified strengthening tube 132. It has spacer tubes 134 mounted near the distal ends that are adapted to hold a skid tube 136 approximately parallel to the modified strengthening tube 132. The skid tubes have radiuses 142 at their distal ends. Wheel mount plates 138 are mechanically affixed between the modified strengthening tube 132 and the skid tube 136. Wheels 140 are bolted to wheel mount plates 138. The wheel and skid tube assemblies 130 are removably attached to legs 8 by end tubes 154. This uses the same mechanical locking arrangement as is provided between the side strengthening tubes 80 and legs 8.

Camera 144 resides on camera base 146 which is mechanically attached to platform 4.

Now, to describe the overall operation we refer to FIGS. 1, 2, and 16 to 20. All components are brought to the location of the container to be vented by drilling. If the terrain will accommodate wheels, or if the terrain is soft or muddy, the wheel and skid assembly 130 may need to be used. The wheels allow for the drum drill apparatus to assembled at a location away from the target container 1 and then wheeled to target container 1. If the ground is soft, skid tube 136 will provide additional surface area to better bear the weight load of the apparatus. This will prevent feet 60 of legs 8 from sinking into the ground and causing an uneven or partially unsupported platform 4. The skid tubes, having ends with radiuses 142, also allow for the sliding of the assembled apparatus into position about target container 1 if the surface is too soft to allow wheels 140 to carry the full weight of the assembled apparatus. Two legs 8 are slidingly inserted into end tubes 154 of each of the wheel and skid assemblies 130 and locking knobs 18 are tightened. Similarly, side strengthening tubes 80 are connected to legs 8. Note that both the wheel and skid assemblies 130 and the side strengthening tubes 80 are of a fixed length and thus not adjustable. There are now a pair of unconnected leg assemblies. On one of the leg assemblies inside back strengthening tube 156 is slid over one leg 8, and on the other leg assembly outside back strengthening tube 158 is slid over another leg 8. Outside back strengthening tube 158 is slid over the inside back strengthening tube 156, and after telescopically adjusting for the width of target container 1, locking knob 18 is tightened to prevent movement. Leg tubes 14 of platform supports 6 are slid over legs 8. Frame 2 is now fully assembled.

If needed, suction ring 88 with suction ring seal 90, is bolted to splash plate 64. Leg tubes 14 are slid into front platform tube 10 and rear platform tube 12. The two leg assemblies (which comprise frame 2) are now connected. The width between the connected leg assemblies is telescopically adjustable between the leg tubes 14 and the front platform tube 10 and rear platform tube 12 in the same fashion as performed with inside back strengthening tube 156 and outside back strengthening tube 158. Frame 2 and platform 4 are now assembled.

The height of platform 4 relative to target container 1 is set by raising platform 4 and tightening locking knobs 18 to engage the appropriate leg orifices 24. Platform height is set so that suction ring seal 90 contacts the top surface of the target container 1. (Note, that this is also the method by which legs 8 are adjusted to compensate for uneven ground.)

Drill assembly 36 is generally left bolted to pivot plate 108 such that t-bolts 40 need only be inserted through bracket holes 42 and threadingly engaged with mount plate bolt holes 34 to attach drill assembly 36 to platform 4. In a similar fashion, control panel 46 is attached to mounting brace 44 with t-bolts 40. Pneumatic line 160 is connected between drill assembly 36 and control panel 46. In a similar fashion pneumatic line 160 is connected between linear actuator 166 and control panel 46. SCBA cylinder 48 is connected to control panel 46 by tubing 62. Grounding stake 52 is pounded into the ground and grounding clamp 50 is clipped onto the target container 1. Camera 144 is mounted on platform 4 such that its viewing angle is correct. Drill bit 66 is chucked into drill assembly 36. The drill bit lengths are provided such as to be of the proper length for operation when platform 4 is set with suction seal ring 90 contacting the top surface of target container 1.

If suction rig 88 was installed, either a standardized, commercially available vacuum system (not illustrated)

would be connected to cam fitting 92 and used to vent the escaping airborne gaseous or particulate contents of target container 1 or an inert cover gas cylinder would be connected so as to provide a supply of inert gas to blanket central passage 96. The inert gas would eliminate any potential mechanical or static electrical sparks thus preventing any ignition and subsequent explosion of combustible vapors. The vacuum system may be fitted with the appropriate filtration media to capture the contents of target container 1, whether particulate or gaseous.

Now, if needed, explosion blanket 82 is attached to frame 2 by mechanical fasteners 200 that are incorporated onto platform 4. At this point, the drum drill apparatus in its assembled state is moved around target container 1 and the operator may proceed to drill the container. If not, the drum drill apparatus may be wheeled or slid into position around the container.

Figure 17:
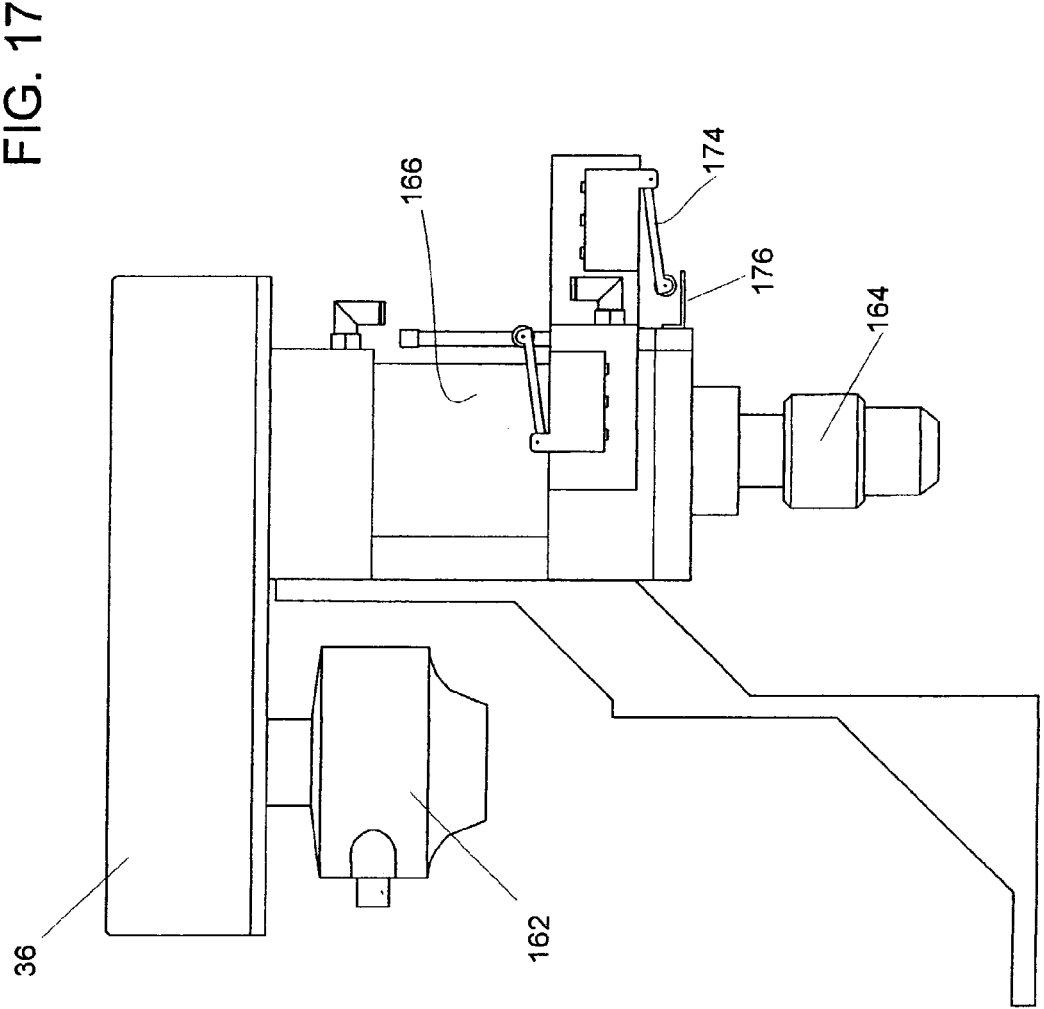
FIG. 17 is an illustrative view of an unextended drill.
Figure 18:
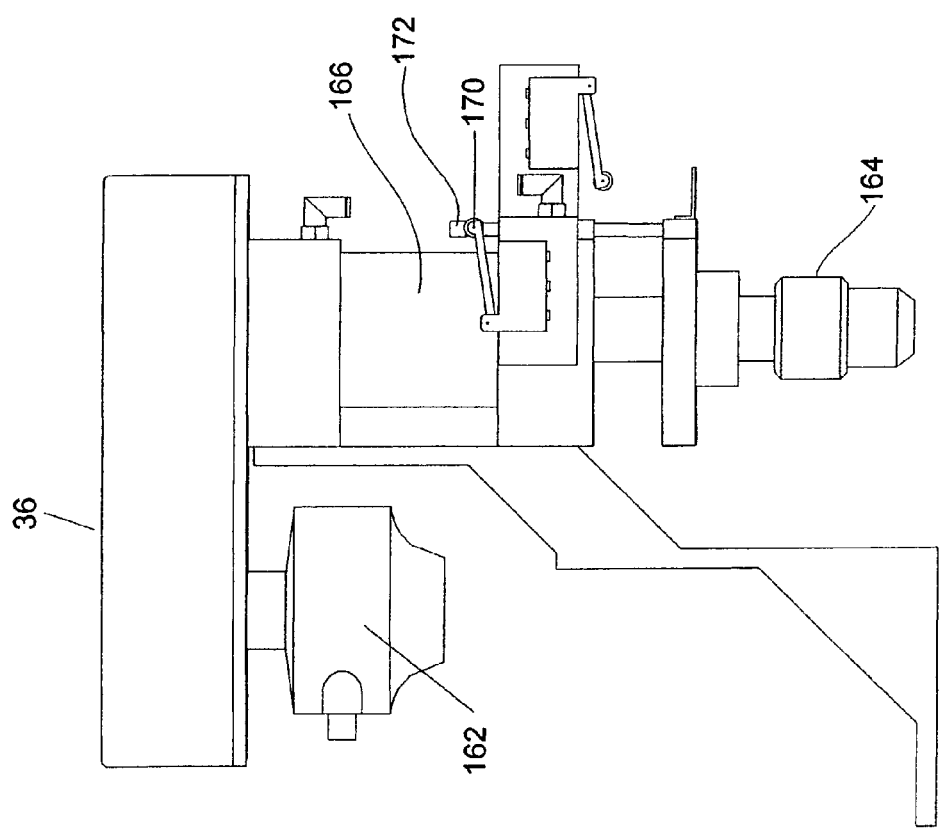
FIG. 18 is an illustrative view of an extended drill.

The operator now either depresses push disk 148 of operation switch 68 or sends a wireless signal to wireless actuator 150 to depress plunger 152 of operation switch 68, depending upon which configuration of remote operation is being used. Both of these actions result in a movement of plunger 152 to send a pneumatic signal to drill motor air supply module 76 (via the appropriate conditioning of top limit switch 174 and bottom limit switch 170 as discussed earlier). Drill motor air supply module 76 in turn provides the appropriate pressurized air to drill assembly 36 via line 160. Air motor 162 spins drill chuck 164 and causes linear actuator 166 to extend spinning drill chuck 164 downward as illustrated in FIG. 18. Drill bit 66 will contact target container 1 and linear actuator 166 will continue to exert enough downward force to drill through the top surface of target container 1. Once there is a through hole, linear actuator will continue to drive drill chuck downward until bottom limit switch 170 contacts bottom stop 172. Bottom limit switch 170 is in pneumatic communication with drill motor air supply module 76 of control panel 46 such that activation of switch 170 stops the supply of air to drill assembly 36 stopping the spinning of air motor 162 and causes linear actuator 166 to retract spinning drill chuck 164 as shown in FIG. 17 until top limit switch 174 contacts top stop 176.

Figure 20:
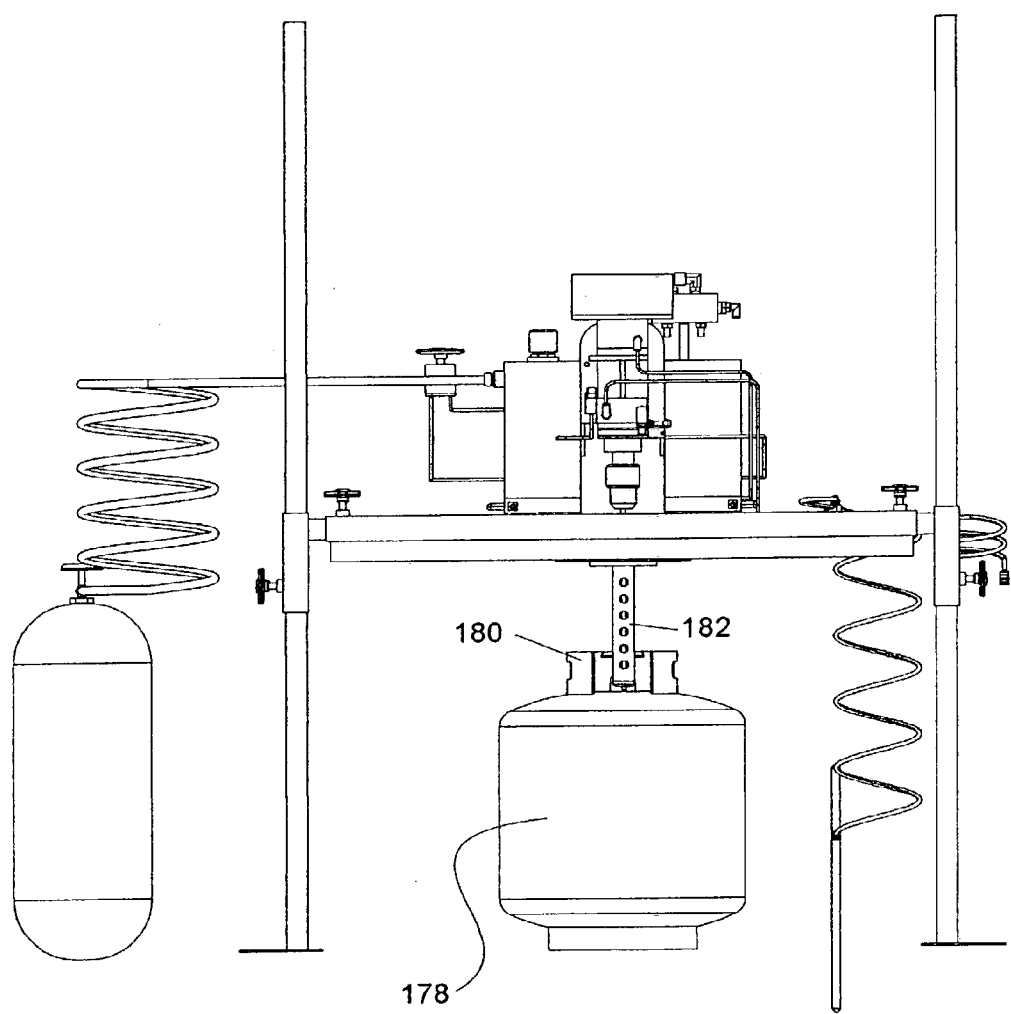
FIG. 20 is a front side view of the drum drilling apparatus adapted for use with an LPG Cylinder.

FIG. 20 shows an alternate embodiment wherein suction ring 88 is not present. When drilling liquid propane gas cylinders (LPG) 178 there is an additional obstacle to overcome in the form of the lifting handle 180. To overcome this physical obstacle, LPG adapter 182 is bolted to splash plate 64 through adapter holes 184 in LPG base 186.

Figure 19:
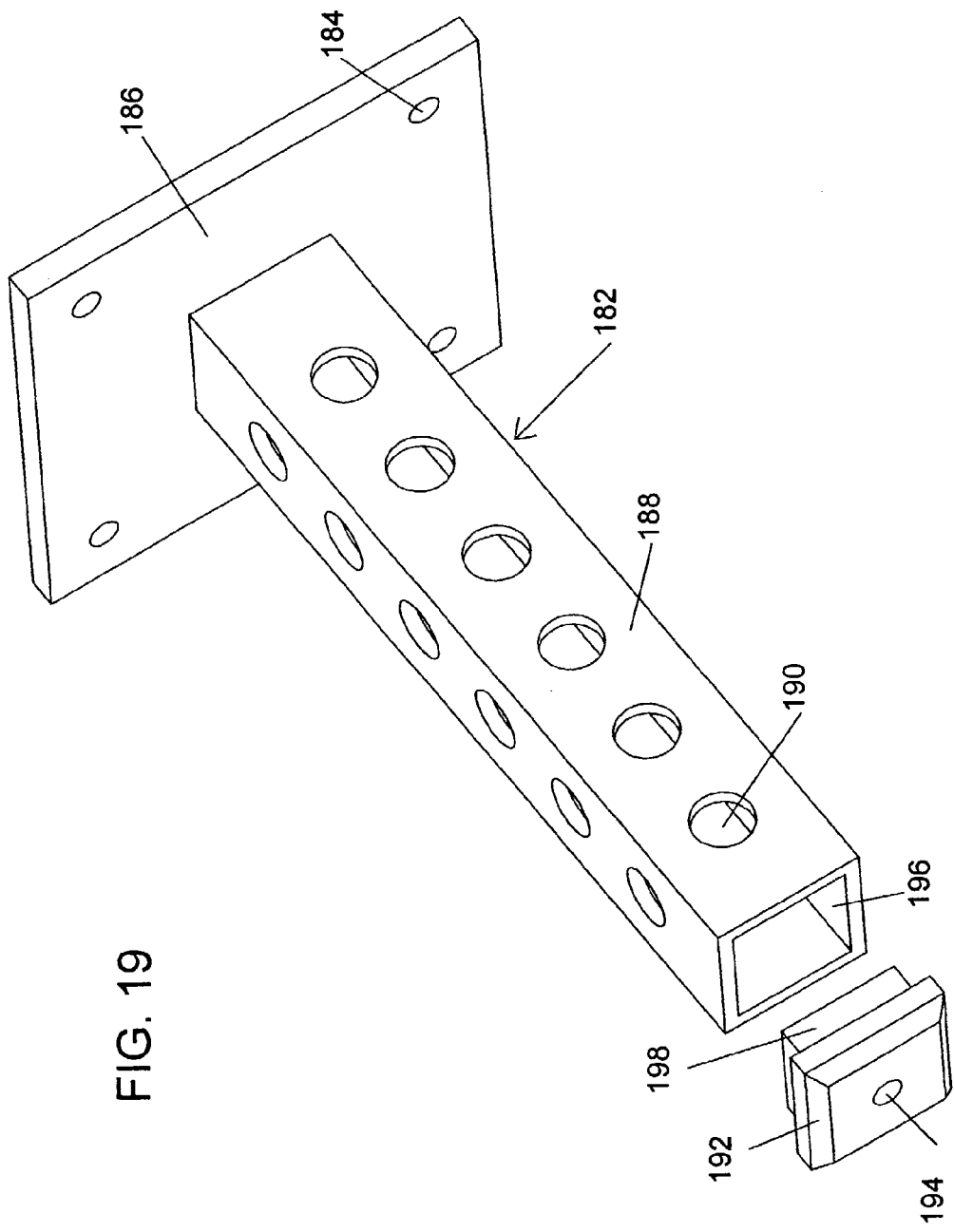
FIG. 19 is a perspective view of the LPG tank adaptor.

Referring to FIG. 19 it can be seen that LPG adapter 182 has down tube 188 affixed normally to base 186. Drill guide 192 has shoulder 198 that matingly conforms to inner recess 196 of down tube 188. A long drill bit is used (not shown) and sized such that when chucked in drill assembly 36 the drill bit will extend through drill guide orifice 194. This serves to support the drill bit and prevent it from "wandering" when drilling at long distances from drilling apparatus 36. View holes 190 allow the operator to confirm that the bit is chucked tightly and still revolving.

In operation, generally there is an absorbent pad placed over the splash plate to ensure there is no contamination from dripping liquids off of the drill bit upon return from drilling. This is not illustrated.

While generally the frame 2 and platform 4 is made of aluminum for weight reasons, they may be made of carbon fiber, another metal or metal alloy or a polymer. Operation and construction would be substantially the same, except if the frame were of a non electrical conducting material then there would need to be a direct connect between grounding clamp 50 and grounding wire 52.

What is claimed is:

1. A container drilling apparatus for the open atmosphere piercing of a container holding potentially hazardous matter, without the use of an enclosed chamber, comprising:
   an unenclosed, open walled, rigid frame adapted for erection about said container;
   a remotely controllable pneumatic drilling device mounted to said rigid frame;
   a drill adapted for vertical travel:
   a pneumatic control panel; and
   a compressed air source, wherein said drill, control panel and air source are in pneumatic communication,
   wherein said rigid frame is comprised of:
   independently vertically adjustable legs;
   a generally planar platform removably attached to said legs; and
   a drill mount plate adapted for vertical angle adjustment, that is attached on said platform and adapted for securing said drill to said platform, and wherein
   said control panel is adapted for mechanical attachment to said platform.

2. The apparatus of claim 1 wherein the number of said legs is four.

3. The apparatus of claim 1 wherein the number of said legs is least three.

4. The apparatus of claim 2 wherein said compressed air source is a self contained breathing apparatus cylinder, and wherein
   said control panel is adapted for connection to said cylinder.

5. The apparatus of claim 2 wherein said compressed air source is a compressor.

6. The apparatus of claim 4 wherein said drill is further comprised of:
   a drill bit;
   a pneumatic motor; and
   a vertically linear actuator, wherein said control panel provides pressurized air to said motor and to said actuator to spin and vertically stroke said drill bit.

7. The apparatus of claim 6 further comprising:
   t-handled bolts; and
   nuts fixedly attached onto said platform;
   wherein said control panel and said drill are adapted for quick attachment to said platform by mechanical engagement between the t-handled bolts and the nuts.

8. The apparatus of claim 7 further comprising:
   a first generally linear skid tube attached between two of said legs and having two curved ends;
   a second generally linear skid tube attached between two of the legs and having two curved ends; and
   at least 4 wheels; wherein
   said first skid tube and said second skid tube have a wheel mechanically fastened at distal ends, and wherein said first skid tube and said second skid tube reside in parallel planes.

9. The apparatus of claim 8 wherein said frame is fabricated from a metal alloy.

10. The apparatus of claim 8 wherein said frame is fabricated from aluminum.

11. The apparatus of claim 8 wherein said frame is fabricated from a polymer.

12. The apparatus of claim 10 further comprising a static electricity suppression system having a grounding clamp, a grounding rod, and grounding wire wherein said clamp and said rod are mechanically fastened to said frame with said grounding wire such that they are in electrical continuity.

13. The apparatus of claim 12 further comprising a remotely operable pneumatic control switch adapted to start and stop said drill.

14. The apparatus of claim 13 wherein said switch further comprises:
- a transmitter switch capable of sending wireless signals; and
- a receiver attached to said control switch and adapted to operate said control switch in response to said wireless signals.

15. The apparatus of claim 2 further comprising:
- a generally planar splash plate defining a central orifice;
- a suction ring defining a second central orifice;
- a suction ring seal defining a third central orifice;
- a tube projecting from said suction ring adapted to allow the flow of an inert gas into said second central orifice; and
- a quick release vacuum connector projecting from said suction ring adapted to allow the vacuum of gases from said second central orifice; and wherein said splash plate resides on said platform beneath said drill and said suction ring is mechanically affixed to said splash plate and said seal is attached to said suction ring such that said central orifice, said second central orifice and said third central orifice are aligned in a stacked configuration.

16. The apparatus of claim 14 further comprising:
- a generally planar splash plate defining a central orifice; and
- a drill bit support guide, wherein said guide is mechanically affixed normal to said splash plate and is adapted to maintain rigidity of movement of said drill bit.

17. The apparatus of claim 15 further comprising:
- a video camera transmitter adapted to send wireless video signals; and
- a video camera receiver adapted to receive wireless video signals; wherein said signals are capable of being viewed on a video monitor.

* * * * *